United States Patent [19]

Hertz et al.

[11] 3,994,736

[45] Nov. 30, 1976

[54] INK COMPOSITION FOR INK-JET WRITING

[76] Inventors: Carl Hellmuth Hertz, Skolbanksvagen 8, Lund; Kjell Åke Gösta Månsson, Onneslov 14, 24013, Genarp, both of Sweden

[22] Filed: Mar. 11, 1974

[21] Appl. No.: 449,833

[52] U.S. Cl. .................................. 106/22; 106/23; 106/308 Q; 346/140 R
[51] Int. Cl.$^2$ ........................................ C09D 11/02
[58] Field of Search ........... 106/22, 23, 288 Q, 289, 106/302, 308 Q; 346/DIG. 1, 32, 75, 140

[56] References Cited

UNITED STATES PATENTS

| | | | |
|---|---|---|---|
| 2,100,204 | 11/1937 | Shore | 106/22 UX |
| 2,356,065 | 8/1944 | Keating | 106/22 |
| 2,873,671 | 2/1959 | Florence | 106/22 X |
| 3,519,443 | 7/1970 | Kaplan et al. | 106/22 |
| 3,705,043 | 12/1972 | Zabiak | 106/22 X |
| 3,887,928 | 6/1975 | Ohno et al. | 346/140 X |
| 3,912,520 | 10/1975 | Miyajima et al. | 106/22 X |

FOREIGN PATENTS OR APPLICATIONS

1,206,534  9/1970  United Kingdom ................... 106/22

OTHER PUBLICATIONS

*The Colour Index,* vol. 3, 3rd Ed., pub. by The Society of Dyers and Colourists, 1991 (pp. 3576–3577, 3586–3589, 3606–3607, 3628–3629 and 3646–3647 relied on).

*Primary Examiner*—Joan E. Welcome
*Attorney, Agent, or Firm*—Bessie A. Lepper

[57] ABSTRACT

A pigment-free, high-intensity, light-fast ink suitable for ink-jet printing comprised of a polar solvent liquid base and a premetallized azo dye. The ink may also contain an inorganic ionizable salt to impart electrical conductivity.

14 Claims, No Drawings

INK COMPOSITION FOR INK-JET WRITING

This invention relates to a novel composition of matter useful as a printing ink, and more particularly to an ink used in ink jet printing.

There has recently been developed a new technique for high-speed printing and this technique has come to be referred to generally as "ink-jet" recording or printing. Exemplary methods and apparatus for ink-jet printing are described in U.S. Pat. Nos. 2,566,443, 3,287,734, 3,416,153, 3,596,275 and 3,717,875.

In ink-jet printing, a liquid ink is forced through a very small-diameter nozzle in a manner to form a stream of essentially uniformly-sized, spaced spherical droplets, the direction of travel of which is controlled usually, although not necessarily, through electrical means. As an example of one type of an ink-jet printer, Hertz in U.S. Pat. No. 3,416,153 teaches the use of a static electric field generated between two electrodes to control the direction of travel of charged droplets in a stream. In this system, each droplet is either permitted to travel along the stream axis to strike a moving surface for printing or caused to be diverted from reaching the surface. In U.S. Pat. No. 3,596,275 the spaced droplets are charged electrostatically in accordance with instantaneous signal valves and then deflected electrostatically in accordance with the charges carried on the droplets. In U.S. Pat. No. 3,717,875, periodic mechanical oscillations within a predetermined frequency range are used to control the divergence of the droplets into two or more separate and distinct streams which are directed away from the printing surface. Those droplets permitted to travel along the normal stream axis are separated from those travelling in the diverged stream and are directed onto the printing surface.

It will be seen from this brief description of several exemplary ink-jet systems that the ink used must possess a unique combination of properties. It must have a viscosity between about 5 and 10 centipoises at 20° C which permits droplet formation when ejected under pressure through the nozzle. It must also possess a high degree of intensity of color. Since nozzle diameters typically range between about 7$\mu$m and 30$\mu$m, nozzle clogging and plugging become major problems. Therefore the ink for an ink-jet system can not contain any fine particulate material such as a pigment which would clog the nozzle nor can it be one which drys to plug the nozzle between printing runs. In direct contrast to this requirement that it does not plug the nozzle is the requirement that the ink be capable of drying at a reasonably rapid rate once it reaches the printing surface. The ink should, moreover, be light-fast for permanence and preferably water-fast for handling and storing the printed material. Finally, for those systems requiring that the ink be electrically charged prior to and/or subsequent to droplet formation, the ink must be electrically conductive. It is readily apparent that this combination of properties is not found in standard printing inks and that it is necessary to provide a special ink formulation for ink-jet printing.

It is therefore a primary object of this invention to provide an improved printing ink for use in ink-jet printing. It is another object to provide an ink of the character described which is free of pigments, has a viscosity suitable for droplet formation and is nondrying in the nozzle while exhibiting acceptable drying rates on the printing surface. It is still a further object to provide such an ink which is light-fast, has a high intensity, and can, if desired, be made electrically conductive. Other objects of the invention will in part be obvious and will in part be apparent hereinafter.

The ink of this invention is formed of a liquid phase comprising a lower-aliphatic monohydric alcohol component and a polyhydric alcohol or a derivative thereof in which is dissolved at least one premetallized azo dye soluble in and essentially inert to the liquid base. If the ink is requied to be electrically conductive, one or more ionizable inorganic salts are added to impart to the ink an electrical conductivity of at least $10^{-5}$ Siemens/cm (equal to an electrical resistivity of $10^5$ Ohm/cm.) It may be desirable in some formulations of the ink of this invention to add a fire retardant material.

The invention accordingly comprises a composition of matter possessing the characteristics, properties, and the relation of components which will be exemplified in the composition hereinafter described, and the scope of the invention will be indicated in the claims.

The liquid base for the ink of this invention must possess two seemingly diametrically opposed characteristics — that of preventing the drying of the ink in the nozzle which causes clogging and plugging if the nozzle is not washed out after each use and that of being able to set up and dry rapidly upon being deposited upon the printing surface, e.g., a piece of paper. The first of these characteristics is imparted by the presence of an aliphatic polyhydric alcohol or a derivative thereof, and the second by a lower-aliphatic monohydric alcohol component. Since washing of the nozzle after each use is usually not a desirable procedure it is normally preferable that the polyhydric alcohol component be present.

As used hereinafter the term aliphatic polyhydric alcohol refers to straight chain aliphatic compounds having two or more hydroxyl groups. Exemplary of such polyhydric alcohols are glycerol (1,2,3-propanetriol, boiling point 290° C), propylene glycol (1,2-propanediol, boiling point 189° C) and ethylene glycol (1,2-ethanediol, boiling point 198° C). The higher boiling point glycerol is preferred. Derivatives of the polyhydric alcohols such the polyglycols may also be used.

As used hereinafter the term "lower-aliphatic" alcohols designate those monohydric alcohols having one hydroxyl group and up to and including 5 carbon atoms in a straight or branched chain. The monohydric alcohol component may be a mixture of lower-aliphatic alcohols, a preferred mixture being about 30% by weight of ethyl alcohol and 70% by weight of n-propyl alcohol.

In making up the liquid base of the ink, between about 10 and about 25 parts by weight of the polyhydric alcohol or a derivative thereof is mixed with 100 parts by weight of the aliphatic monohydric alcohol. This means that the polyhydric alcohol constituent amounts to between about 9% and about 20% by weight of the liquid base. The liquid base constituents in combination must be a solvent for the dye used as well as essentially inert to the dye.

The component imparting the desired color to the ink must be a dye, that is, it must be a material containing one or more chromophoric groupings and be free of any particulate matter, i.e., pigment particles. The dye must be soluble in the liquid ink base. A preferred class of dyes are those classified as premetallized azo dyes which are generally soluble in such polar organic solvents as acetone (CH$_3$COCH$_3$), butyl acetate (CH$_3$COO(CH$_2$)$_3$CH$_3$), ethyl acetate (CH$_3$COOC$_2$H$_5$), ethyl cellosolve (C$_2$H$_5$OCH$_2$CH$_2$OH), methyl cellosolve (CH$_3$OCH$_2$CH$_2$OH) and ethyl alcohol (C$_2$H$_5$OH).

The metallic ion of these dyes is typically chromium or copper complexed with the dye molecule which contains the so-called "azo" grouping —N=N— joining suitably-substituted aromatic and herterocyclic ring groupings. The metallic ion contributes the quality of light-fastness to the dye. Exemplary of such dyes are the following (listed in "The Colour Index" Third Edition, Volume 5, Page 5609, published by The Society of Dyers and Colourists and The American Association of Textile Chemists and Colorists in Great Britain 1971):

C.I. Solvent Black 27
C.I. Solvent Blue 70
C.I. Solvent Red 118
C.I. Solvent Red 119
C.I. Solvent Orange 56
C.I. Solvent Orange 54
C.I. Solvent Red 122
C.I. Solvent Yellow 79
C.I. Solvent Yellow 81
C.I. Solvent Yellow 82.

As indicated on page 5609 of Volume 5 of "The Colour Index", all of these dyes are sold under the general tradename of NEOZAPON by Badische Anilin — & Soda-Fabrik AG.

Illustrative of these Solvent dyes is a red dye which is the chromium complex of

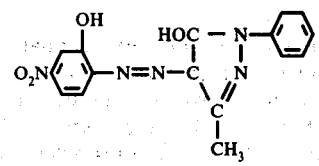

formed by heating the dye with chromium formate in formamide for 4 to 5 hours at 110° C to obtain the desired light-fast dye containing one atom of chromium to two molecules of the azo dye. In a similar manner, other azo dyes may be converted to the premetallized form to form light-fast dyes of high-intensity.

In forming the ink of this invention it is preferable to use these dyes in concentrations ranging from between about 6% and about 8% of the weight of the liquid base. The dye component may, of course, be one or a mixture of dyes to obtain the desired color. Because of the chemical nature of these dyes, it is possible to dissolve relatively large amounts of the dye in the liquid base, a fact which contributes materially to the obtaining of good intensity printing. This is of particular importance in obtaining a good, intense black ink printing with inks which are entirely free of any fine pigments.

Due to the polar nature of the liquid base, the ink of this invention has a certain inherent degree of electrical conductivity. However, in such ink-jet printing systems as described in U.S. Pats. 3,416,153 and 3,596,275 where the operation of the system depends upon the ink's being charged electrically, it will generally be preferable to add a small amount of an ionizable inorganic salt formed of a chloride or nitrate anion and an alkali metal cation, a term used hereinafter to include the ammonium ion. Thus such salts as LiCl, NH$_4$NO$_3$, NH$_4$Cl, NaCl, KCl and the like may be added in amounts to impart to the ink an electrical conductivity of at least 10$^{-5}$ Siemens/cm. All inks with conductivities greater than 10$^{-5}$ Siemens/cm may be used. However, conductivities within the range of about 10$^{-3}$ Siemens/cm to 10$^{-1}$ Siemens/cm are preferred.

Due to the combustible nature of the monohydric aliphatic alcohol component it may be desirable for some uses to add an effective amount of a fire retardant material such as one or more halogenated materials which are soluble in the liquid base and nonreactive with the dye. Exemplary of such fire retardants are trichloroethylene, carbon tetrachloride and hexachlorobenzene.

The viscosity of the ink when used in an ink-jet printing system should not be greater than about ten times that of water, i.e., it should not be greater than about 10 centipoises at 20° C. It is preferable that the viscosity of the ink be between 1 and 5 centipoises at 20° C.

The ink of this invention may be further described with reference to the following example which is meant to be illustrative and not limiting.

A liquid base was formed by first mixing 30 grams of ethyl alcohol (99.5% grade) with 70 grams of propyl alcohol (99.5% grade). Then 5 grams of C.I. Solvent Blue 70 (sold by Badische Anilin - & Soda-Fabrix AG. under the tradename of Neozapon Blue FLE) were added with stirring to the liquid base. To this was added 0.36 grams of NH$_3$Cl (99% grade) and thoroughly mixed in. Finally, 20 grams of glycerol (99% grade) was added and the mixture was stirred to obtain thorough mixing. This ink had a viscosity of 3 centipoises at 20° C and an electrical conductivity of 10$^{-3}$ Siemens/cm.

In a similar way red and yellow inks can be obtained. Black ink can be prepared either by using C.I. Solvent Black 27 or by mixing a suitable amount of each of the blue, red and yellow inks together.

This ink was suitable for use in an ink-jet system similar to that disclosed in U.S. Pat. No. 3,416,153 having a nozzle with an inside diameter of 10μm. The system was capable of remaining unused for more than 60 days without clogging the nozzle with the ink.

It will thus be seen that the objects set forth above, among those made apparent from the preceding description, are efficiently attained and, since certain changes may be made in the above composition of matter without departing from the scope of the invention, it is intended that all matter contained in the above description shall be interpreted as illustrative and not in a limited sense.

We claim:

1. A pigment-free ink for printing with liquid ink-jet systems comprising a lower-aliphatic monohydric alcohol, at least one premetallized dye dissolved therein, and an inorganic salt in an amount sufficient to impart to said ink an electrical conductivity of at least 10$^{-5}$ Siemens/cm; said ink having a viscosity no greater than 10 centipoises at 20° C.

2. An ink in accordance with claim 1 including a polyhydric alcohol in an amount up to about 25% by weight of said lower-aliphatic monohydric alcohol.

3. A pigment-free ink for printing with liquid ink-jet systems, comprising in combination
   a. a liquid base consisting essentially of a lower-aliphatic monohydric alcohol component and up to about 25% by weight of said monohydric alcohol of a polyhydric alcohol;

b. at least one premetallized dye dissolved in said liquid base; and c. an ionic inorganic salt in an amount sufficient to impart to said ink an electrical conductivity of at least $10^{-5}$ Siemens/cm; said ink having a viscosity no greater than 10 centipoises at 20° C and being characterized as rapid drying and essentially light-fast.

4. An ink in accordance with claim 3 wherein said monohydric lower-aliphatic alcohol component is a mixture of ethyl alcohol and propyl alcohol.

5. An ink in accordance with claim 4 wherein the weight ratio of said ethyl alcohol to said propyl alcohol is about 30/70.

6. An ink in accordance with claim 3 wherein said polyhydric alcohol is present in said liquid base in a quantity ranging between about 10% and 25% by weight of said lower-aliphatic monohydric alcohol.

7. An ink in accordance with claim 3 wherein said polyhydric alcohol is glycerol.

8. An ink in accordance with claim 3 wherein said dye is present in an amount equivalent to between about 6% and about 8% by weight of said liquid base.

9. An ink in accordance with claim 3 wherein said dye is a mixture of blue, red and yellow dyes in combination to form a black dye.

10. An ink in accordance with claim 3 wherein said ionic inorganic salt is present in an amount equivalent to about 0.3% by weight of said liquid base.

11. An ink in accordance with claim 3 wherein said ionic inorganic salt is the chloride or nitrate salt of an alkali metal ion.

12. An ink in accordance with claim 3 including a fire retarding effective amount of a fire retardant material dissolved in said ink.

13. A pigment-free ink for printing with liquid ink-jet systems, comprising in combination a. a liquid base consisting essentially of a lower-aliphatic monohydric alcohol component and a polyhydric alcohol component selected from the group consisting of glycerol, propylene glycol, ethylene glycol and polyglycols, said polyhydric alcohol component being present in an amount up to about 25% by weight of said lower-aliphatic monohydric alcohol component;

b. at least one premetallized dye free of any particulate matter dissolved in said liquid base; and c. an ionic inorganic salt in an amount up to about 0.3% by weight of said liquid base;

said ink having a viscosity no greater than 10 centipoises at 20° C and an electrical conductivity of at least $10^{-5}$ Siemens/cm and being characterized as nonclogging in the nozzle of an ink-jet printer, rapid drying when applied and essentially light-fast.

14. An ink in accordance with claim 13 in which said lower-aliphatic monohydric alcohol component is a mixture of ethyl and propyl alcohols, said polyhydric alcohol component in glycerol and said ionic inorganic salt is ammonium chloride.

* * * * *